J. MAITLAND & W. J. BEATTIE.
MACHINE FOR FOLDING COLLAR BLANKS, &c.
APPLICATION FILED AUG. 18, 1905.

1,071,677. Patented Aug. 26, 1913.
10 SHEETS—SHEET 1.

J. MAITLAND & W. J. BEATTIE.
MACHINE FOR FOLDING COLLAR BLANKS, &c.
APPLICATION FILED AUG. 18, 1905.

1,071,677.

Patented Aug. 26, 1913.
10 SHEETS—SHEET 3.

WITNESSES

INVENTORS

FIG 4

J. MAITLAND & W. J. BEATTIE.
MACHINE FOR FOLDING COLLAR BLANKS, &c.
APPLICATION FILED AUG. 18, 1905.

1,071,677.

Patented Aug. 26, 1913.
10 SHEETS—SHEET 5.

FIG 5

WITNESSES

INVENTORS

FIG 6

UNITED STATES PATENT OFFICE.

JOHN MAITLAND AND WALTER J. BEATTIE, OF COHOES, NEW YORK, ASSIGNORS TO BEATTIE MACHINE WORKS, OF COHOES, NEW YORK, A CORPORATION OF NEW YORK.

MACHINE FOR FOLDING COLLAR-BLANKS, &c.

1,071,677.            Specification of Letters Patent.      Patented Aug. 26, 1913.

Application filed August 18, 1905. Serial No. 274,678.

*To all whom it may concern:*

Be it known that we, JOHN MAITLAND and WALTER J. BEATTIE, citizens of the United States, residing at Cohoes, county of Albany, and State of New York, have invented certain new and useful Improvements in Machines for Folding Collar-Blanks, &c., of which the following is a specification.

The invention relates to such improvements and consists of the novel construction and combination of parts hereinafter described and subsequently claimed.

Reference may be had to the accompanying drawings, and the reference characters marked thereon, which form a part of this specification. Similar characters refer to similar parts in the several figures therein.

This invention relates to automatic or power machines as distinguished from hand machines and includes a rotary multiple bed and means for folding certain sides of a collar or cuff blank on one of the plane surfaces of the bed and the other parts on another surface of the bed whereby a much narrower blank, such as is used for the bands of some collars can be folded than is possible with a folding machine which folds all sides of a blank simultaneously.

The edges of the fabric blanks are inturned or folded over former-plates by means of folder-plates movable to and fro on the surface of the bed after which the former-plates movable to and fro on the head, commonly called former-head, are withdrawn from the folds and the folds pressed between the folder-plates and the bed to fold and press the edges of the blanks, the operation of the former and folder-plates being similar to that of hand machines heretofore in use, one form of which is illustrated in U. S. Patent No. 713,230, issued to us November 11, 1902, to which reference may be had in connection with this specification.

The other novel features will be hereinafter more fully described and claimed.

Figure 2:
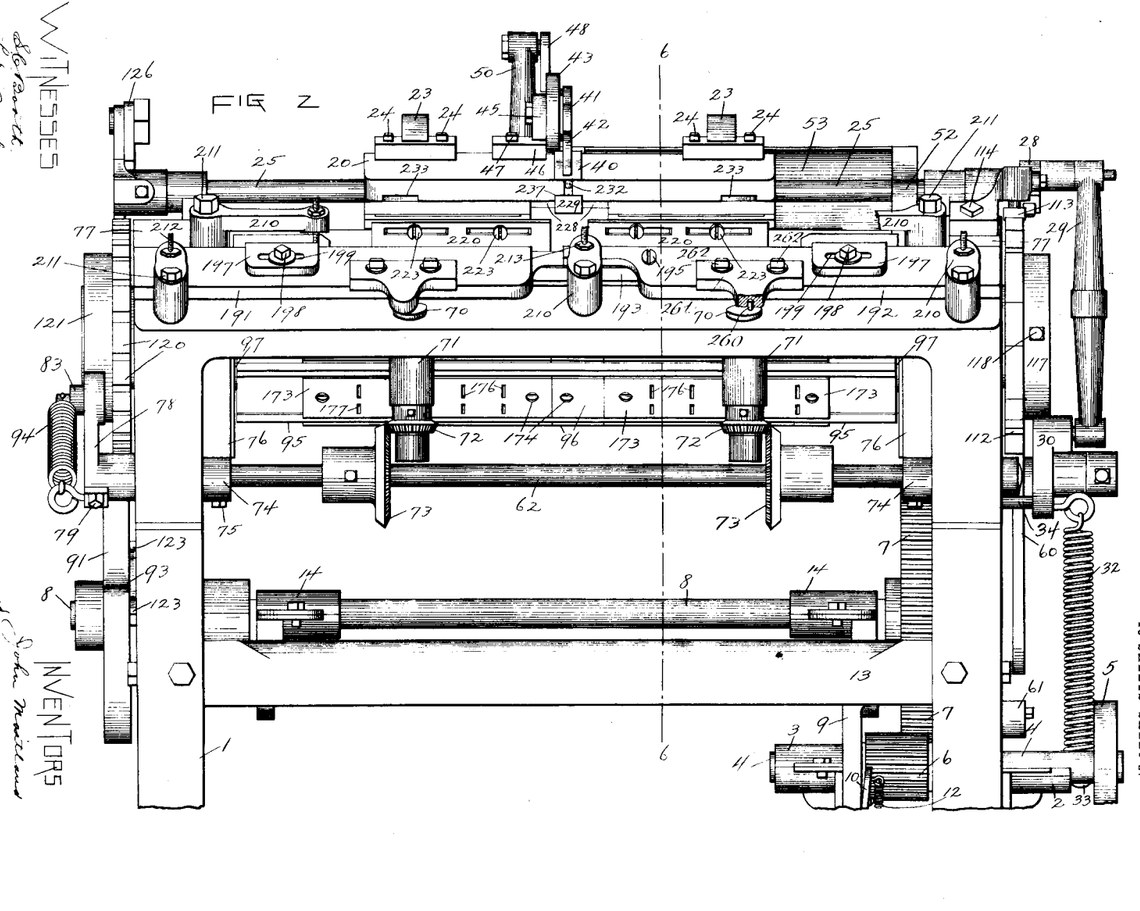
Fig. 2 is a front elevation of the same.
Figure 3:
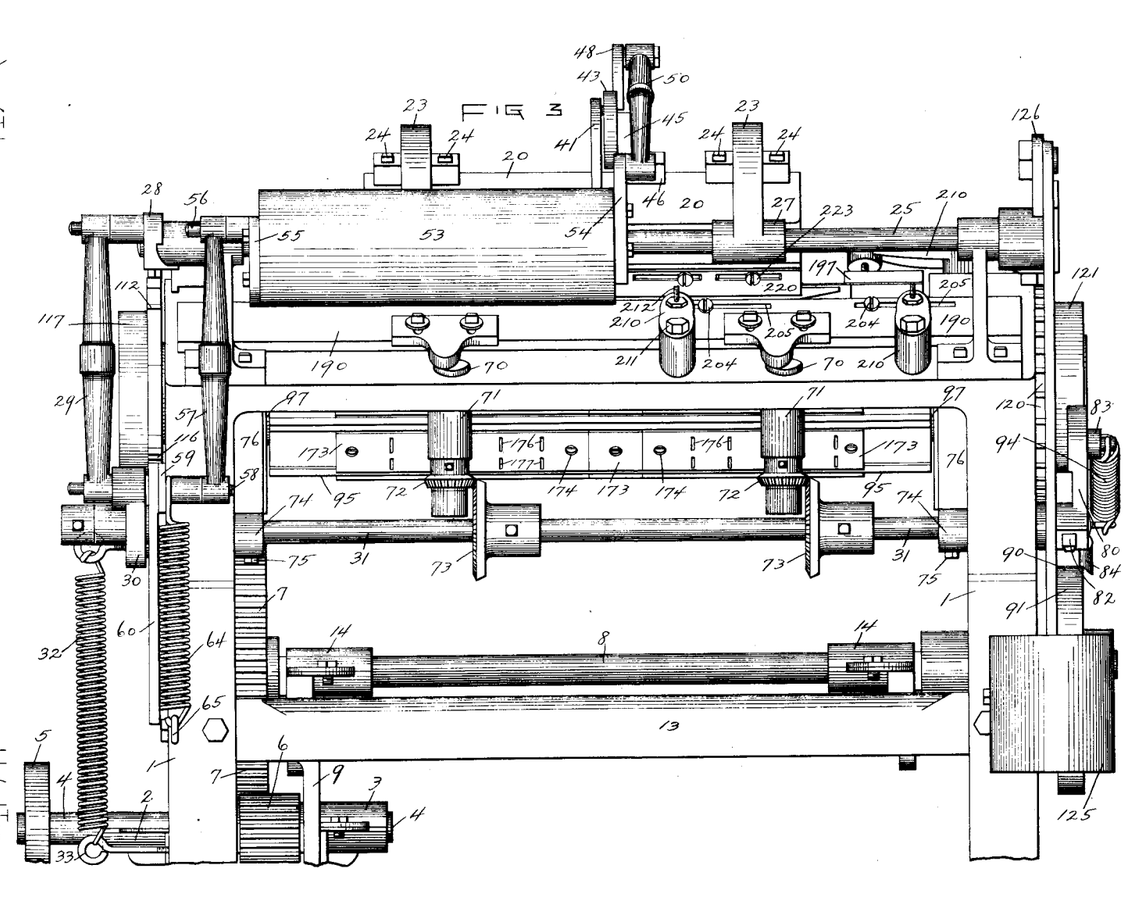
Fig. 3 is a rear elevation of the same.

Referring to the drawings, 1, represents the main frame of the machine which supports, in the bearings, 2 and 3, a power-shaft, 4, which may be provided with the band-wheel, 5, for driving the shaft and the pinion, 6, fixed on the shaft and adapted to mesh with gear-wheel, 7, fixed on the shaft 8, the bearing, 3, being supported by a hanger, 9, to which is pivoted a pawl, 10, controlled by a spring, 12, and adapted to engage with a pinion, 6, to prevent backward movement of the power-shaft, the hanger, 9, depending from the longitudinal beams 13. The shaft, 8, is rotary in bearings, 14, and is provided at the right-hand end, as seen in Fig. 2, with cam-wheels or disks fixed thereon, which cam-wheels are shown in elevation in Fig. 4, and on the opposite end of the shaft with other cam-wheels or disks which are shown in elevation in Fig. 5. These cam-wheels serve to automatically impart to the various mechanisms their working movements.

Figure 4:
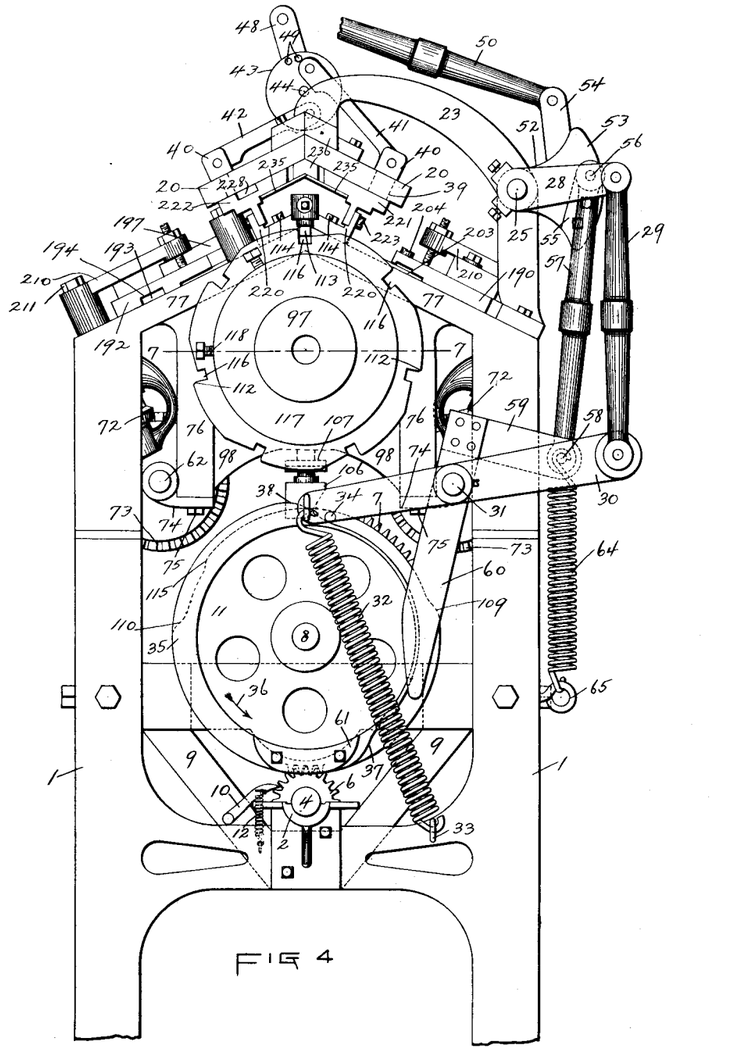
Fig. 4 is an end view in elevation as the same appears when viewed from the right-hand end of the machine as shown in Figs. 1 and 2 showing the former disconnected and collapsed.

At the top of the machine is located the former-head, 20, which supports the former-plates, 21 and 22, which have a slide movement on the head, as will be hereinafter more fully described. The former-head is provided with the arms, 23, fixed at one end to the head as by the bolts, 24, and fixed at their other ends upon the shaft, 25, by means of set-screws, 26, passing through collars, 27, to engage with the shaft as seen clearly in Fig. 1. The shaft, 25, is provided with a rock-arm, 28, fixed upon the shaft which arm is connected by link, 29, with one end of lever, 30, pivoted on the end of shaft, 31, the other end of lever, 30, being connected by a spring, 32, with the eye, 33, inserted in and projecting from the main frame as seen in Fig. 4. The inner end of lever, 30, is provided with an inwardly projecting pin, 34, adapted to engage with the cam-wheel, 35, being held in contact therewith by the spring 32.

Figure 13:
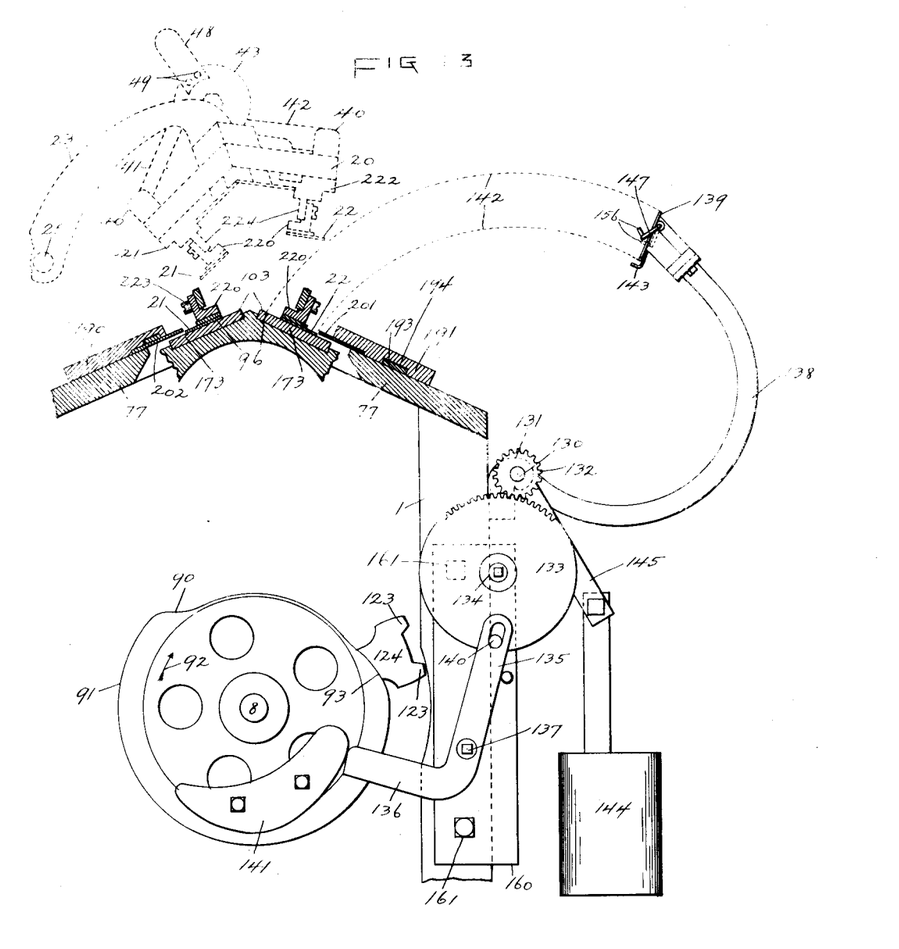
Fig. 13 is a view in end elevation of a portion of the end of the machine shown in Fig. 5 provided with an attachment for automatically placing collar blanks on the bed of the machine and showing by dotted lines the former in an expanded condition and raised from the bed of the machine and by solid section lines resting on the bed, the folders being shown withdrawn from the formers.

The cam-wheel is rotated in the direction of the arrow, 36, when the machine is in operation and when the cam, 37, engages the follower or pin, 34, it actuates the lever, 30, which by means of link, 29, and lever, 28, rocks the shaft, 25, thereby lifting the former-head, 20, off from the bed by means of the arms, 23, to the elevated position shown in Fig. 13. A full rotary movement of the cam-wheel, 35, will permit the pin-follower, 34, to pass down the cam, 38, and restore the former-head to the bed of the machine in the position shown in Figs. 4 and 5.

Figure 5:
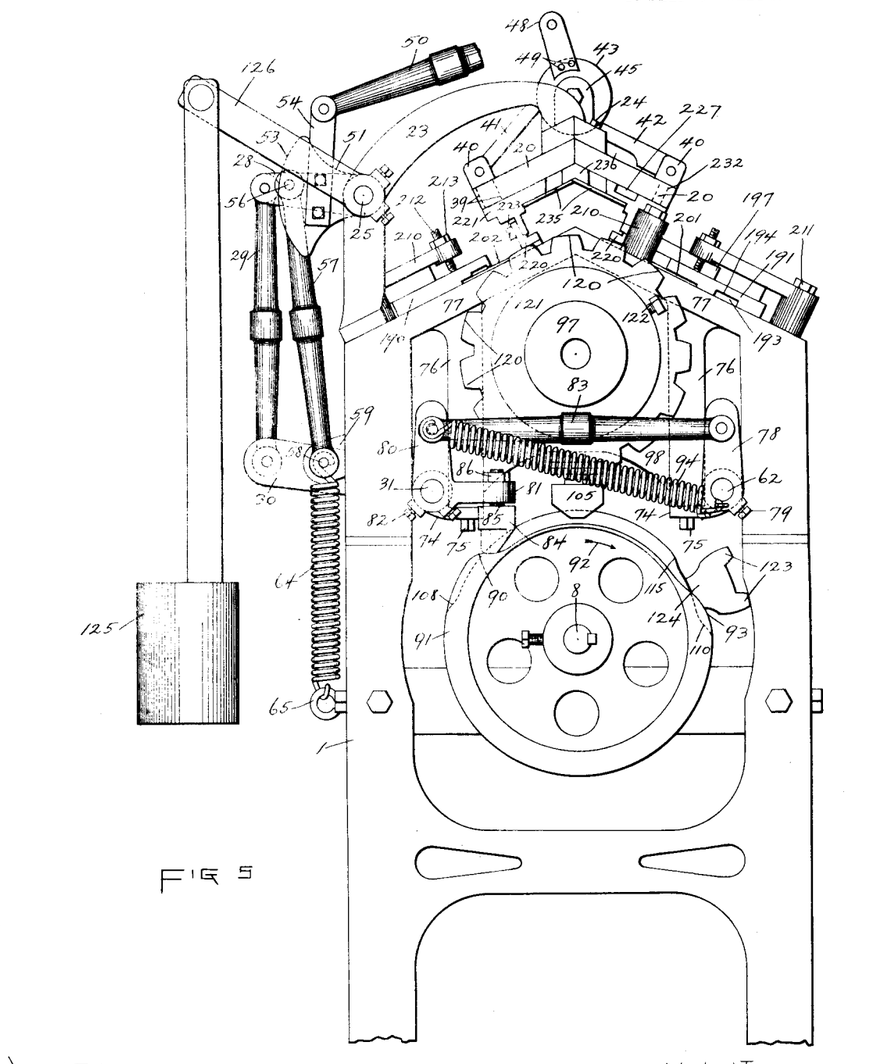
Fig. 5 is a view in elevation of the opposite end of the machine showing the former expanded.
Figure 6:
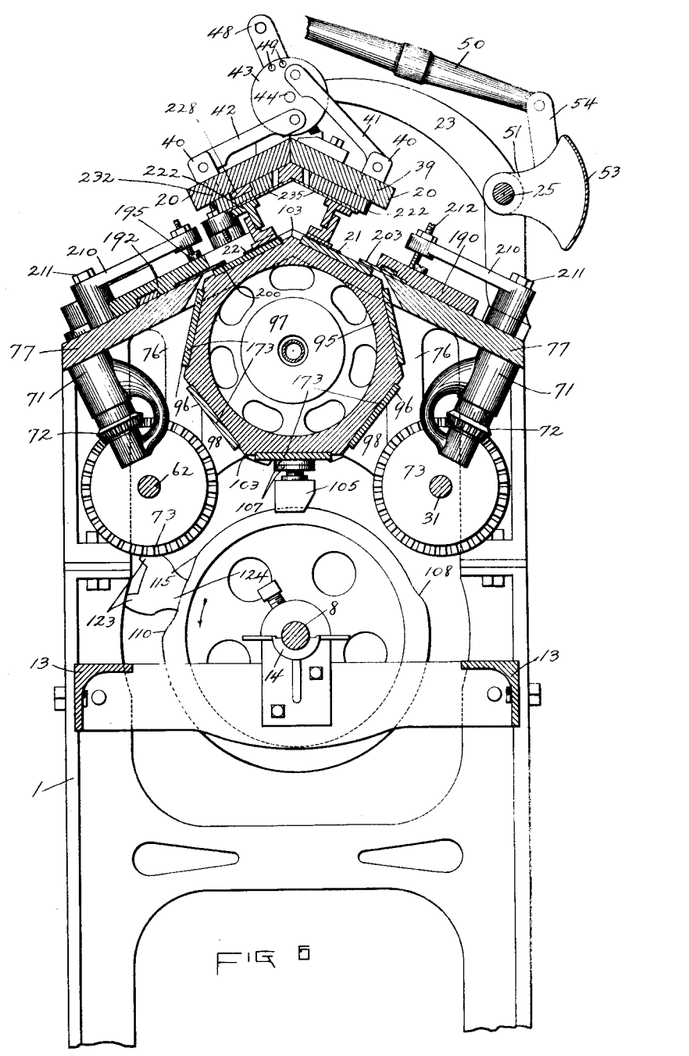
Fig. 6 is a vertical cross-section taken on the broken line 6—6 in Fig. 2 looking toward the left-hand end of the machine with the former contracted as shown in Fig. 4.

As a means for automatically communicating slide movements to the former-plates, 21, on the former-head which are connected with the slide-posts, 40, as will be hereinafter more fully described, said blocks are respectively connected by links, 41 and 42, with the crank disk, 43, rotatory upon a stud, 44, projecting from the upright, 45, provided with the base-block, 46, secured to the former-head by means of a screw-bolt 47. The disk is provided with a crank-arm, 48, secured thereto, as by the rivets, 49, and this crank-arm is pivotally connected by means of link, 50, with a lever pivotally supported upon the shaft, 25, comprising the arms, 51, and 52, connected by the segment, 53, of a cylindrical shell and provided with the arm, 54, fixed to and projecting from the arm 51. The other arm, 52, is provided with a projecting arm, 55, having a projecting stud, 56, pivotally connected by link, 57, with a stud, 58, projecting from one arm, 59, of a bell-crank lever fulcrumed upon the shaft, 31, the other end, 60, of the bell crank lever being adapted to be engaged by cam, 61, secured to and projecting from cam-wheel, 35, so that the rotary movements of such cam-wheel will actuate the rock-lever, 59 and 60, link, 57, segment, 53, link, 50, and crank-disk, 43, to cause the slide movement of the former-plates in one direction, and when the cam, 61, passes from the lever-arm, 60, the spring, 64, secured at one end to the eye, 65, projecting from the frame of the machine and at the other end to the lever-arm, 59, restores the parts, including the slide-blocks, 40, to the position shown in Fig. 4, thereby producing the required slide movements of the former-plates. The folder-plates are actuated by crank-disks, 70, operating in substantially the same manner as that described in said former patent. Each of said crank-disks has a crank-pin, 260, which closely fits an aperture in the block, 261, which is attached to the folder-plate by means of bolts, 262, thus establishing a close-fitting crank-connection between the respective crank-disks, 70, and the folder-plates or blocks, as shown in detail near the righthand end of Fig. 2, where the block, 261, is shown partly broken away and in section, to illustrate the manner of connecting the crank-disk, 70, with the folder-plate or block 192. As a means for automatically operating these crank-disks the shafts of which are rotary in bearing-sleeves, 71, depending from the main frame and provided at their lower ends with the bevel-gear, 72, we provide bevel-gears, 73, fixed upon shafts, 31 and 62, adapted to engage with the bevel-gears, 72, there being one shaft and gears on each side of the machine for operating the oppositely disposed folders. As shown in Fig. 5 these shafts are supported in bearings on the outer ends of brackets, 74, secured by screw-bolts, 75, upon the lower ends of the parts, 76, depending from the inclined roof, 77, of the main frame which afford guideways for the slide-boxes of the revolving bed, as will be hereinafter more fully explained.

The end of the shaft, 62, shown in Fig. 5 is provided with a rock-arm, 78, fixed thereon, as by means of set-screw, 79, and the shaft, 31, is provided with a rock-lever comprising the arms, 80 and 81, fixed upon the shaft as by set-screw 82. The arms, 78 and 80, are pivotally connected by the link, 83, and the arm, 81, of the rock-lever is provided with a cam-follower, 84, adjustably secured thereon by means of a screw-threaded stem, 85, passing through a similar screw-threaded aperture in the arm, 81, and fixed thereon by a lock-nut 86. This follower is adapted to be engaged by a cam, 90, on cam-wheel, 91, rotary in the direction of the arrow, 92, which rocks the rock-lever and imparts a rocking movement in one direction to both shafts, 31 and 62, by means of the connecting link, 83, and when the raised portion of the cam-wheel, 91, passes the cam-follower, the follower rides down the cam, 93, and rocking movement in the opposite direction is imparted to the shafts, 31 and 62, by means of the spring, 94, fixed at one end to arm, 80, of the rock-lever and at the other end each to the fixed support, as shown.

As a means for supporting and rotating the multiple bed cylinder or shell, 95, which is exteriorly provided with seven plane surfaces, 96, we provide the shell with trunnions, 97, inserted one in each end of the shell, the openings at the ends of the shell being contracted to fit and support the trunnions, also slide-bearings for the trunnions consisting of boxes, 98, vertically movable in the hanger guides, 76, the tongues, 100, on the boxes being movable in the corresponding grooves, 101, in the guides. The bearing aperture, 102, for the trunnion is clearly shown in Fig. 8.

Figure 8:
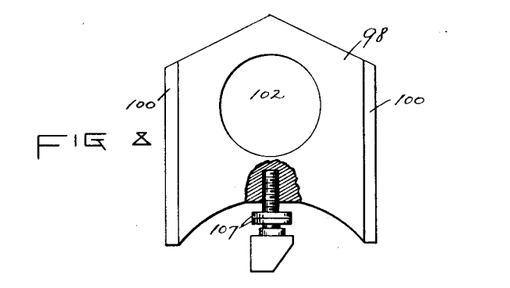
Fig. 8 is a view in elevation of the slide-box shown in Fig. 7 detached together with its operating cam-follower.

The objects of supporting the rotary bed in vertically movable bearings and imparting a vertical movement to the bed are to press the folded blank between the bed and folders, also to permit of its rotation without the engagement with the folders of its corners, 103, formed by two neighboring exterior plane surfaces, the bed being dropped or lowered during each rotary movement and afterward being raised to the proper position for folding the blanks. As a means for raising and lowering the bed we provide the cam-followers, 105 and 106, which are secured to the slide blocks containing the bearings for the bed trunnions. These cam-followers are provided with a screw-threaded stem which is adjustably inserted in its screw-threaded aperture in the lower side of the bearing box, as seen in Fig. 8 of the drawings, where they may be securely locked in any adjusted position by means of the lock-nuts 107. The cam-followers are actuated by cams on the main-shaft, the follower, 105, by the cam, 108, and the cam-follower, 106, by the cam, 109, to lift the bed from the position shown in Figs. 4 and 5 to cause the same to engage with the folder-plates to press the fold.

As the cam-wheels continue to rotate in the direction of the arrows the cams, 110, permit the rotary bed to drop to its lowest level so as to disengage the teeth or catches, 112, from the stop, 113, which stop serves to lock the bed against rotative movement, the stop being rigidly secured to the frame of the machine by means of the bolts, 114, and later the cams, 115, raise the bed to the position shown in Fig. 4 and lock the same from rotary movements by means of engagement of stop, 113, with one of the teeth 112. When the cams, 108 and 109, engage the followers to raise the bed to its highest position, as in pressing, the stop, 113, enters the notch or groove, 116, at the base of a tooth engaging with the stop. The teeth, 112, are formed on a wheel provided with a collar, 117, adapted to fit on one of the bed trunnions, 97, and be secured thereto by means of a set-screw 118. The trunnion at the opposite end of the rotary bed is provided with a wheel having teeth, 120, and hub, 121, adapted to be secured to the trunnion by means of set-screw 122. These teeth, 120, are adapted to be engaged by the teeth, 123, on the arm, 124, secured to and projecting from one of the cam-wheels which impart vertical movements to the bed and thereby impart intermittent, rotary movements to the bed. Each revolution of the arm, 124, imparts to the bed one-seventh of a complete rotation so as to present successively each one of the seven plane surfaces of the bed to the folding mechanism. The locking wheel is provided with seven teeth, 112, and notches, 116, to lock the bed in each successive rotary position and permit of its vertical movement while in such position to press the folds in the blanks.

A counterbalancing weight, 125, pivotally secured to lever, 126, serves to assist the movement of raising the former-head from the position shown in Figs. 4 and 5 of the drawings, to that shown in Fig. 13.

Figure 15:
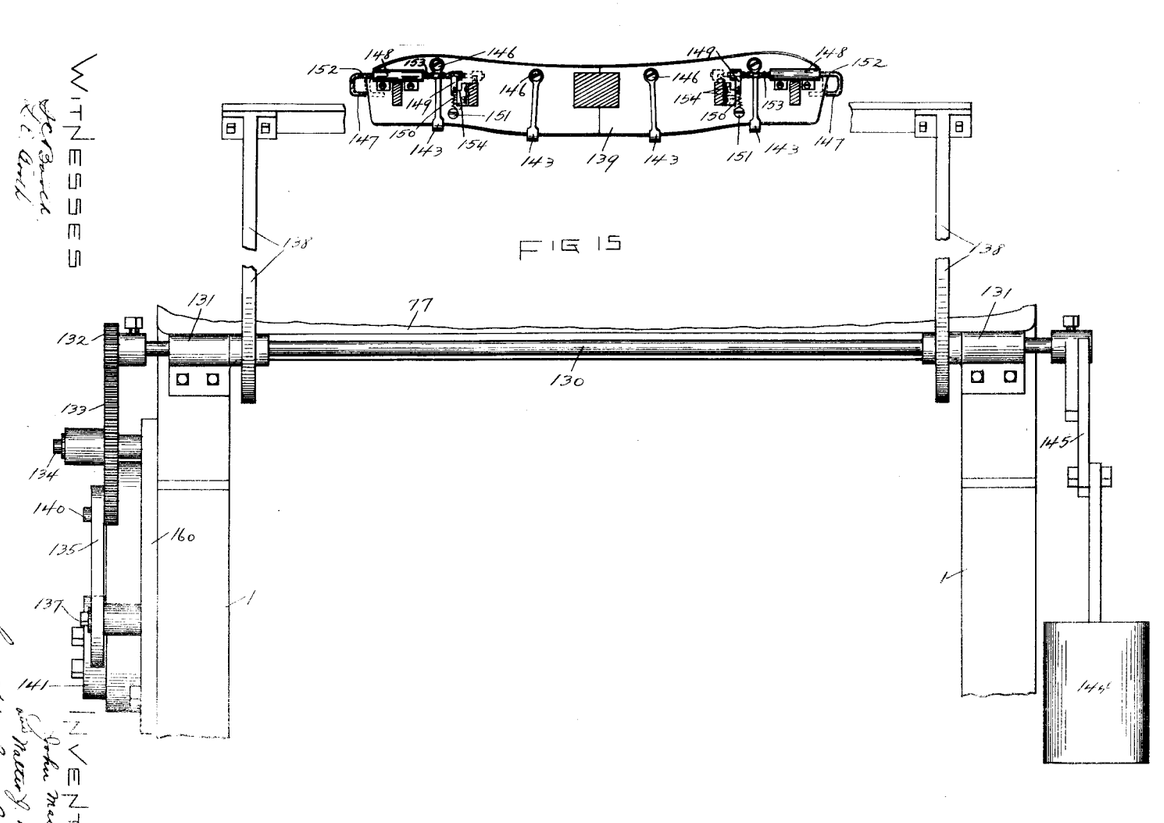
Fig. 15 is a view in front elevation of the automatic feeding mechanism viewed from the right-hand as shown in Fig. 13.

The blanks may be fed to the machine by hand in the usual manner of placing the blanks upon the bed of hand machines, but we have shown in Figs. 13 and 15 means for automatically feeding blanks to the machine comprising a shaft, 130, rotary in suitable bearings, 131, secured to the main frame of the machine provided at one end with a pinion, 132, fixed on the shaft and adapted to mesh with the segmental gear, 133, rotary upon the stud, 134, projecting from the block, 160, and actuated by means of the rock-lever having the arms, 135 and 136, fulcrumed at 137, upon the block, the shaft, 130, being provided with the curved rock-levers, 138, which support the feed-board 139. The arm, 135, of the rock-lever engages with the stud, 140, of the gear-segment and the arm, 136, is engageable by cam, 141, on one of the cam-wheels secured to shaft, 8, to impart a vibratory movement to the rock-levers, 138, to carry the feed-board to and from the rotary bed along the path indicated by the curved dotted lines, 142, in Fig. 13, the counterbalancing-weight, 144, pivotally secured to the rock-lever, 145, fixed on shaft, 130, serving to retract the feed-board and its supporting mechanism to the position shown in Fig. 13 as the actuating cam, 141, recedes from the lever-arm, 136, the cam, 141, and the lever, 136, being so adjusted that the extreme movement produced by the cam will force the feed-board down upon the rotary bed. The feed-board is preferably of a shape conforming approximately to that of the blank to be folded.

We have shown in Fig. 15 of the drawings the feed-board approximately of the shape of a collar-band, the back of the board being shown in such figure. The springhooks, 143, projecting beyond the face of the board, as shown in Fig. 13, are secured to the back of the board by means of screws, 146, and serve to support the blank and prevent its slipping down the face of the board when in the position shown in Fig. 13. The ends of the blank are secured to the board by means of the crank-arms, 147, which may be made of wire or other like material. The crank-shafts, 152, are capable of rocking and slide movements in supporting sleeves, 148, fixed upon the back of the board.

The inner end of each shaft is provided with a rock-lever, 149, connected by a spring, 150, with the fixed support on the board, as screw, 151, which tends to force the crank-arm, 147, against the back of the board. The crank-shafts, 152, are each provided with a coil-spring, 153, bearing at one end upon the sleeve, 148, and at the other end upon the lever, 149, which tends to force the shafts inwardly from the ends of the board toward its middle. Fixed to the back of the board are the stops, 154, adapted to be engaged by the levers, 149, when the crank-shafts have been pushed outwardly and hold the shafts in outward position, the levers being yieldingly held in engagement with the stops by the springs 150.

When ready to receive a blank the crank-arms, 147, are in the position shown by solid lines in Figs. 13, and 15 that is projecting beyond the ends and in front of the feed board. The blank is placed on the front of the board with its lower edge resting upon the hooks, 143, and its ends between the crank-arms and the plane of the face of the feed-board. The crank-arms are pushed back, forcing the ends of the blank back of the plane of the feed-board until the levers, 149, slip from the stops, 154, whereupon the crank-arms are drawn inwardly along the back of the board to the position shown by dotted lines in Fig. 15. The springs, 150, forcing the crank-arms against the back of the board, cause them to clamp the ends of the blank firmly between the arms and board. The crank-arms, 147, are also provided each with a projection, 156, projecting beyond the face or front of the board so that they will engage the rotary bed of the machine when the blank is fed thereon and rock the crank-shaft, 152, sufficiently to relax the grip of arms, 147, upon the ends of the blank permitting the ends of the blank to straighten out and escape from the arms so that when the board is swung back from the rotary bed to the position shown in Fig. 13 the blank will be permitted to remain upon the rotary bed of the machine in position to be operated upon by the folding mechanism.

Figure 14:
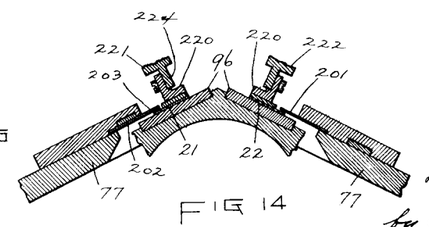
Fig. 14 is a fragmentary view showing the relative position of the rotary bed, formers and folders, when the former-plates are expanded and resting upon the bed and the folder-plates advanced to overlap the former-plates.

The feed attachments mounted upon block, 160, can be removed from the machine by withdrawing the bolts, 161, which secure the block to the main frame of the machine. After the blank has been deposited on the rotary bed, as before explained, the former descends from the position shown in dotted lines in Fig. 13 upon the bed so that the former-plates, 21 and 22, occupy the position shown by solid lines in such figure, holding the blank firmly upon the bed while the folder-plates, advance from the position shown in Fig. 13 to that shown in Fig. 14 thereby folding one side of the blank just deposited on the bed whereupon after the folding operation is completed the former-plates are lifted up again to the position shown by dotted lines in Fig. 13, the bed rotated so as to carry the bed-surfaces on which the blank, just folded on one side, rests, one space to the left whereupon another blank is deposited on the exposed plane surface on the right and the former again brought down and the folders operated as before to fold the front side or edge of the blank last deposited and the infolded edge of the blank previously deposited, whose front edges were previously folded.

As a means for securely retaining the blank first deposited on the plane surface of the bed in position thereon after its front edges have been folded and while the bed is being rotated one space to the left we provide each of the seven plane surfaces of the bed with a series of projecting points, 170, which are forced into the fabric of the blanks and serve to hold them in the same relative position during the rotary movements of the bed.

Figure 9:
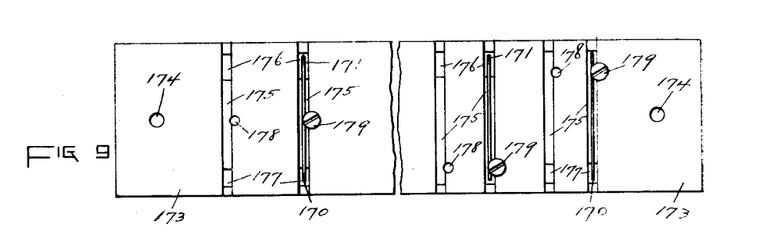
Fig. 9 is a bottom plan view of one of the bed-plates detached showing the yielding points and lifters or guides for holding and guiding the work.

As a means for supporting that edge of the blank last to be folded in a raised position so that the folder-plate will with certainty pass under the edge of the blank during its initial folding movement to fold the edge of the blank over a former-plate we provide a series of spring-controlled projections or lifters, 171, in the bed of the machine which will lift up the edge of the blank but will then be depressed into grooves or slots in the bed by the movement of the folder so as not to interfere with its folding movement. Two methods of applying such points and lifters are shown in Figs. 9, 10, 11 and 12. The bed-plates, 173, are made detachable being provided with screw-holes, 174, by which they can be secured to the rotary bed. That portion of the detachable bed-plate shown on the left of Fig. 9 is provided on its undersurface which is the surface exposed to view in Fig. 9 with grooves, 175, having near each end and midway of the groove a screw-aperture 178. The groove shown on the left is empty, the one on the right adjacent to it is shown provided with a wire bent to form on one end a lifter, 171, which occupies the slot, 176, and on the other end a point, 170, which occupies the slot, 177, a side view of the wire detached being shown in Fig. 10. The wire is held in the groove by means of a screw 179. The yielding nature of the wire permits the lifter and point to be depressed below the face of the plate.

A preferable method of supporting the lifters and points is shown at the right-hand end of Fig. 9 where a separate groove is provided for the lifters and points, and the screw-hole is located near one end of the groove instead of near the middle making the distance between the screw and the point or lifter nearly double that in the other form of construction, and thereby securing a better spring movement of the parts when depressed below the face of the bed.

Figure 10:
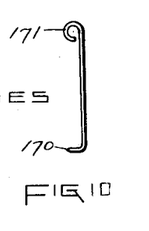
Figs. 10, 11 and 12 are side elevations of the points and lifters detached.
Figure 11:
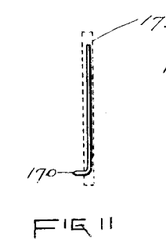
Figure 12:
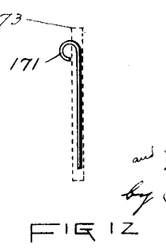

In Fig. 10 is shown a lifter and point on one wire and in Figs. 11 and 12 only one point and one lifter is shown on a single wire; and the relative position of the points and lifters to the bed-plate when they are free to project therefrom is shown by dotted lines in Figs. 11 and 12, the dotted lines indicating an end view of the bed-plate 173.

The general operation of the machine in folding collar or cuff blanks is as follows:— Starting with the position of the cams shown in Figs. 4 and 5 of the drawings the first movement of the folding mechanism is produced by cam, 90, which operates the folder-actuating mechanism as before explained to cause the folder-plates to fold the edges of the blank over the former-plates, then the cam, 61, (Fig. 4) engages lever, 60, to operate the mechanism which expands and contracts the former-plates, the cam serving to contract the plates and the spring, 64, to expand the same, after which the cams, 108, on one end of the machine and, 109, on the opposite end of the machine engage the followers, 105 and 106, to lift the vertically movable bed to its highest limit to press the folded edges of the blank whereupon the cam, 37, Fig. 4, engages the cam-follower, 34, to actuate the mechanism which lifts the former from the bed of the machine to the position shown by dotted lines in Fig. 13 and hold it in a raised position until cam, 38, passes the follower, 34, allowing spring, 32, to return the former to the bed of the machine. While the former is in elevated position the cams, 110, next pass the followers, 105 and 106, allowing the bed to drop and discontinue the pressure upon the blanks between the bed and folders whereupon the folders are drawn back by means of the cam, 93, passing the follower, 84, allowing the spring, 94, to retract the folder-plates at which time the teeth, 123, engage the teeth, 120, secured to the rotary-bed to rotate the bed one space, the bed being allowed to drop while this operation is continued by means of the lowest cam depression immediately following cams 110. The next movement is produced by cam, 141, (Fig. 13) which actuates the feeding mechanism to deposit a fresh blank upon the rotary bed, directly after which the cam, 38, passes the follower, 34, and allows the expanded former to be forced down upon the blanks by means of the spring, 32, in position to be acted upon by the folders, actuated by the cam, 90, which inaugurates a repetition of the operation described.

The number of plane sides or surfaces on the rotary bed can be varied within certain limits, but we find the most practical form of construction is that of a bed having seven plane surfaces arranged substantially as shown.

The surfaces should be plane to afford a proper bed for the blanks and the folders and formers, and the number of surfaces should be such that the angular projections which are the most remote from the axis of the rotary bed shall not project so far from the axis as to necessitate too much vertical movement of the bearings of the bed to enable the projections to clear the folder-plates when the bed is rotated. It is also desirable to have the plane surfaces of the bed of such a width measured circumferentially of the shell that the working surfaces of the successive plane beds may be relatively near each other whereby the former-head can be made relatively small and compact which will permit both the former-plates and connections to be supported from a single head.

By having the bed rotary and folding the opposite side edges of a blank successively on different beds, we are able to fold narrow blanks which it would be impossible to fold on machines heretofore produced where all the sides of the blank are folded at the same time on a single bed.

When all the sides are folded simultaneously the blank must be wide enough to permit the former-plates to be withdrawn toward each other from the folds before the plates can be lifted from the blank, and if the blank was very narrow the former-plates or their supports would strike each other before being fully withdrawn from the folds, but with our form of construction by which the opposite sides of a blank are folded successively the former-plates can be withdrawn from the folds without interfering with each other, even though the blank was so narrow that the folded over edges would meet and actually contact with each other.

Any known form of construction may be utilized in the construction and operation of the folder and former-plates. We have, however, shown an improved form of construction for actuating the folder-plates. The plates, 200 and 201, are secured to and supported by slide-blocks; that plate, on the rear side of the machine which folds only one edge of the blank, being supported by the block, 190, and those on the front side by the slide-blocks, 191, and 192.

In our said Patent, No. 713,230, two crank disks are employed for each separate folder-block to communicate thereto the required slide movements, but we have ascertained that a single pair of crank-disks, 70, may be made to operate the two blocks, 191 and 192, when the two blocks are connected by a bar, 193, secured in the channel, 194, formed in the lower side of such blocks, as by the screw, 195, inserted from the upper side of one block. It is immaterial which block is secured to the bar but one of the blocks should be unsecured so as to permit of free slide movements of the blocks to and from each other. The bar is preferably made of sufficient length to extend nearly the whole length of the block which slides thereon so as to maintain the two blocks always in the same line with each other. With this connection between the two blocks it is obvious that a rotary movement of the disk, 70, in a direction to cause their cranks to approach each other will cause the blocks to slide toward each other and toward the middle portion of the machine, and a rotary movement in the opposite direction will cause the blocks to recede from each other and move toward the front edge of the machine thereby producing the same relative movement of the two folder-supporting blocks which was shown and described in said Patent No. 713,230, and for the same purpose, that is, to cause the folder-plates to fold the edges of one side and ends of the blank over the former-plates.

The blocks are preferably provided with separate end-pieces, 197, which are adjustably secured thereto by means of the screw-bolts, 198, passing through the slot, 199, which permits the end folder-plates, 200 and 201, to be adjusted at different distances from each other to accommodate the machine for folding collar blanks of different lengths.

The folder-plate on the rear side of the machine is preferably made of two sections, 202 and 203, which are adjustably secured to the single folder-block, 190, by means of the screw-bolts, 204, passing through slots, 205, to accommodate the curves, 206, to different forms and lengths of blanks.

The arms, 210, secured to the main frame of the machine by screw-bolts, 211, are made to operate upon the different parts of the folder-blocks to resist the upward pressure of the movable bed during the operation of pressing the folded blanks. The arms are each provided with a screw or other adjustable finger, 212, adapted to bear upon the folder-blocks. These screws may be turned or adjusted to afford different degrees of pressure, then locked in position by the locking-nuts 213.

Figure 16:
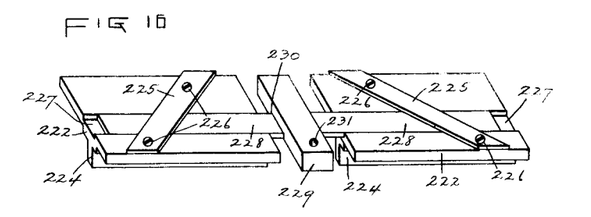
Fig. 16 is a view in isometrical perspective of the diagonally movable former blocks detached from the former-head and showing the upper sides which engage the head when in use.
Figure 17:
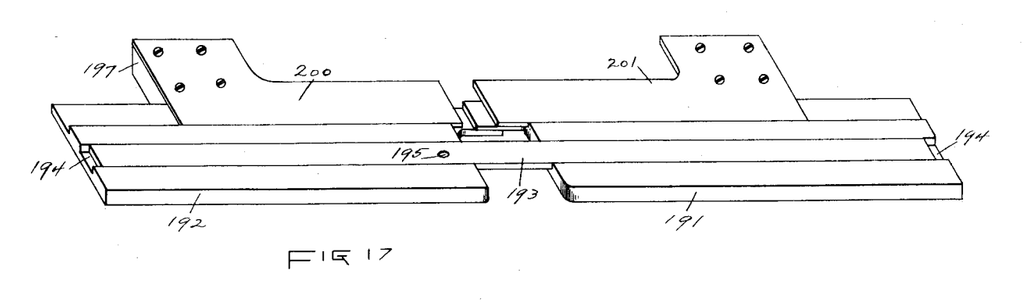
Fig. 17 is a view in isometrical perspective of the folder-plate blocks for folding on three sides, with the thin plates attached, and viewed from the lower side.

The former-plates, 21 and 22, are secured to the former-blocks, 220, which blocks are adjustably secured to the carriers, 221 and 222, respectively by means of screws 223. The carriers, 222, shown in perspective in Fig. 16 are each provided on their lower surfaces with a depending flange, 224, to which the former-blocks are directly secured, and on their upper surfaces with a cleat, 225, secured to the blocks as by screws, 226, also on their upper surface with a groove or channel, 227, adapted to receive a slide-bar, 228, movable in such channels beneath the slide-cleat.

The slide-block, 229, is provided with a channel, 230, on its lower side adapted to receive the slide-bar, 228, and on its upper side with an aperture, 231, adapted to receive pin, 232, depending from the slide-block, 40, actuated by link, 42, as hereinbefore described. The slide-cleats, 225, are adapted to slide in slide-grooves, 233, formed in the lower surface of the former-head. The carriers are held up against the lower surface of the former-head by means of the plates, 235, secured to the block, 236, depending from the middle portion of the former-head as seen in Fig. 4.

It is obvious from the foregoing that slide movements of the block, 40, connected by pin, 232, with block, 229, will impart to the latter corresponding slide movements in the slide-way, 237, formed in the lower surface of the former-head, as seen in Fig. 2, which movements impart through the slide-bar, 228, similar slide movements to the carriers, 222, but the cleats, 225, movable in the slide-ways, 233, on the lower surface of the former-head impart to the carriers a slide movement along the bar, 228, to or from each other, the resultant movements of the carriers and the former-plate carried by them being diagonal movements similar to those shown in our said Patent No. 713,230, thereby adapting the former-plates to fold a blank on three sides.

Figure 1:
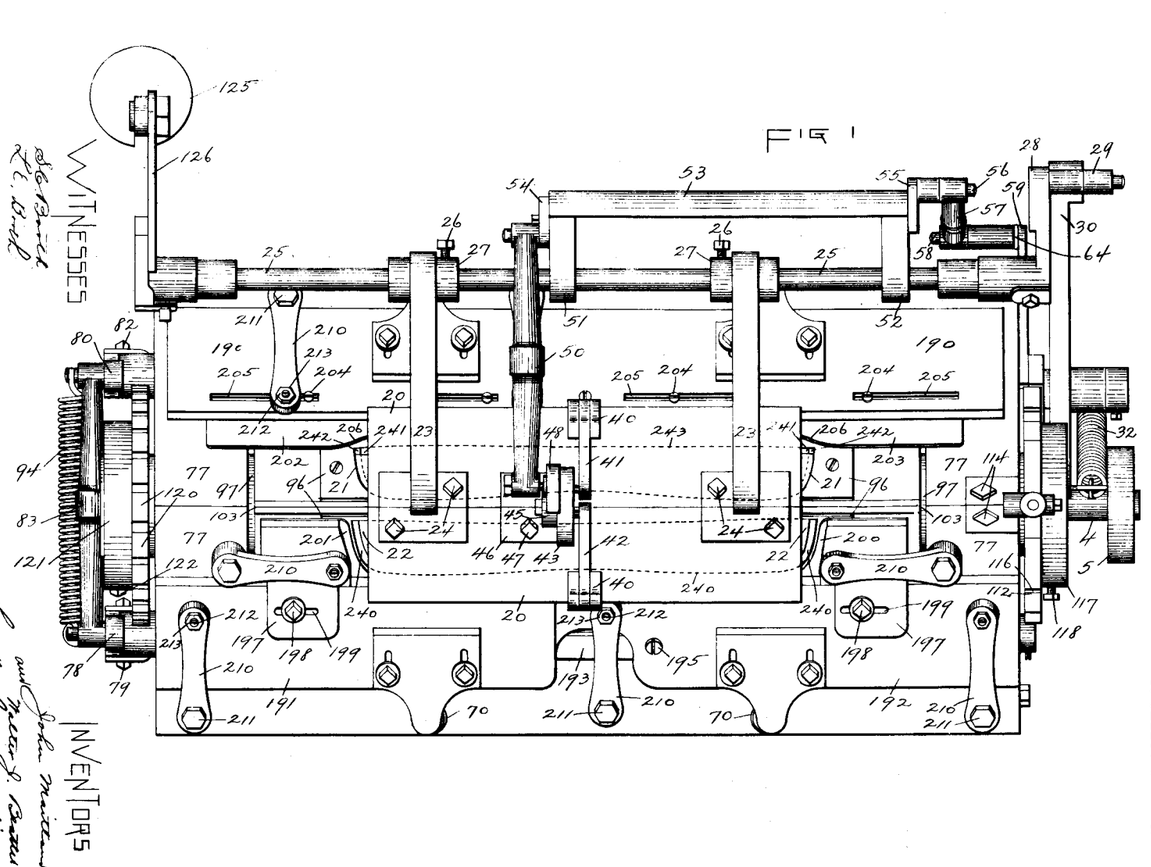
Figure 1 of the drawings is a top plan view of the improved folding machine.

As the former-plates, 21, are designed to fold a blank on one side only the carriers, 222, by which they are carried are secured directly and positively to the actuating slide-block, 40, on the neighboring side of the former-head, as indicated by dotted lines, 39, in Figs. 4 and 5. In Fig. 1 of the drawings is shown partly in dotted lines a blank, 240, with the former-plates, 22, resting thereon in an expanded position.

The inward movement of the folder-plates, 200 and 201, infolds the edge of the blank over the former-plates which are afterward withdrawn and the fold pressed as hereinbefore described. The rotary movement of the shell which supports the plurality of beds serves to carry this partly folded blank over to the position shown by the blank, 241, in Fig. 1. As shown at, 242, the ends of the blank have been folded over and are covered by the expanded former-plates, 21, except at the extreme corners as shown (Fig. 1.) The remaining approximately straight edge indicated by dotted lines, 243, is then folded over the neighboring edge of the former-plates, 21, thereby folding the remaining side of the blank which is pressed after the former-plate is withdrawn at the same time that the folds formed on the other three sides of the succeeding blank are pressed, that is, by pressure between the shell, supporting the several beds and the folder-plate. It will thus be seen that the former and folder-plates are arranged in sets, the former-plates, 22, and their coöperating folder-plates, 200 and 201, forming one set for folding the blank on three sides, and the former-plates, 21, and the coöperating folder-plates, 202 and 203, forming another set.

The two sets of folding mechanism act independently of each other to inturn the edges of the blank and act successively on the same blank which renders it possible to employ former-plates of a width and size sufficient to approximately cover the blank without interfering with their slide movements which withdraw them from the folds formed by inturning the edges of the blank, whereas if the blanks were folded on all sides at the same time the space required for the former-plates and for their movements would preclude their use with small or narrow blanks like those shown in Fig. 1.

The member, or shell, which supports the plurality of beds or blank supporting surfaces, being rotary in bearings capable of reciprocatory movements toward and from the folder-plates, renders the mechanism capable of pressing the folded blanks between the beds and the folder-plates, and the revoluble movement of the beds located on the periphery of the rotary shell, will carry them to and from the successive sets of folding mechanism, that is, a blank will be carried by the particular bed on which it is placed first to one set of folding mechanism where the blank can be folded on three sides and then to another set of folding mechanism where the same blank can be folded on the remaining side.

Figure 7:
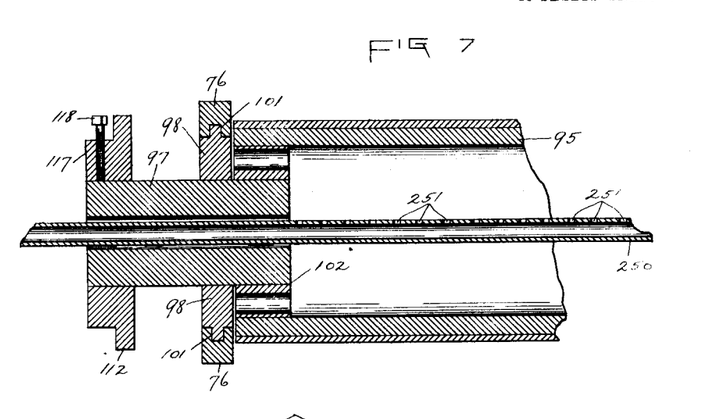
Fig. 7 is a horizontal section taken on the broken line 7—7 in Fig. 4 showing one end of the rotary vertically movable bed and the slideways and slide-box which support that end.

Any known means for heating the rotary shell and blank-supporting beds may be employed. In Fig. 7 is shown in section a part of a gas-pipe, 250, provided with jet orifices, 251, adapted to maintain jets of flame interiorly of the rotary shell, the pipe being inserted through the apertured trunnions, 97, and connected with a gas supply, not shown.

What we claim as new and desire to secure by Letters Patent is—

1. In a folding machine, the combination with a plurality of formers and folders; and means for imparting operative movements thereto; of a movable blank-supporting bed coöperative with at least one of such formers and folders in one position and with another former and folder in a different position; and means for moving such bed from one coöperative position to another.

2. In a folding machine, the combination with a movable blank-supporting bed; and means for moving the bed from one position to another; of a former and folder coöperative with the bed to fold one edge of a blank while the bed is in one position; another former and folder coöperative with the bed to fold another edge of such blank while the bed is in another position; and means for imparting operative movements to the formers and folders, substantially as described.

3. In a folding machine, the combination with a plurality of revoluble blank-supporting beds; and means for imparting revoluble movements thereto; of a plurality of sets of folding mechanisms each set including a former and a folder and constructed to successively coöperate, one set at a time with each bed in turn, substantially as described.

4. In a folding machine, the combination with a plurality of sets of folding mechanisms each including a former and a folder; of a blank-supporting bed movable from one to another of said sets of folding mechanisms and coöperative therewith successively; and means for operating the several parts.

5. In a folding machine, the combination with a plurality of sets of folding mechanisms each including a former and a folder; of a rotatory member having a plurality of blank supporting beds adapted to be brought by the rotation of such member successively into position to coöperate with said sets of folding mechanisms successively, and means for operating the several parts.

6. In a folding machine, the combination with a plurality of sets of folding mechanisms, each including a former and a folder, and arranged to operate in a plane at an angle to the plane of operation of another set; of a rotatively mounted shell having on its periphery a plurality of blank supporting beds adapted to be brought by rotation of said shell successively into position to coöperate with said sets of folding mechanisms successively, and means for operating the several parts.

7. In a folding machine, the combination with a plurality of sets of folding mechanisms each including a former and folder; of a member rotatory in bearings capable of reciprocatory movements toward and from such sets and provided with a blank-supporting surface capable of revoluble movements toward and from such sets successively; means for imparting reciprocatory movements to the blank-supporting surface at one time and means for imparting revoluble movements, at other times, substantially as described.

8. In a folding machine, the combination with two folder-plate sections, on one side of the machine, provided with a slide connection extending lengthwise of the plate-sections; of a single actuating crank connected by a close-fitting connection with each section whereby a circular motion is imparted to the plate sections; and means for operating the cranks, substantially as described.

9. In a folding machine, the combination with two folder-plates adapted to fold one side of a blank and portions of two other and oppositely disposed sides; of a slide-connection between the plates extending lengthwise of their neighboring parts and transversely of the other parts which are adapted to fold portions of the opposite sides of the blank; a plate-actuating crank connected by a close-fitting connection with each of such folder-plates whereby a circular motion is imparted to the plate sections; and means for operating the cranks, substantially as described.

10. In a folding machine, the combination with a bed-plate having on its lower side a plurality of grooves severally provided with a small aperture leading from the groove through the upper surface; of blank-retaining pins severally projecting, through the small apertures, above the upper surface of the bed and provided with supporting spring-shanks located in the grooves, and means for securing the shanks in the grooves, substantially as described.

11. In a folding machine, having its bed movable, the combination with a bed-plate having on its lower side a plurality of grooves, severally provided with a small aperture leading from the groove through an upper surface engageable with a folder-plate; of blank-lifting fingers severally projecting, through the small apertures, above the upper surface of the bed and provided with supporting spring-shanks located in the grooves; and means for securing the shanks in the grooves, substantially as described.

In testimony whereof, we have hereunto set our hands this 24th day of December, 1904.

JOHN MAITLAND.
WALTER J. BEATTIE.

Witnesses:
E. M. O'REILLY,
S. C. BOOTH.